March 31, 1970 K. PRESTON, JR., ET AL 3,503,684

METHOD AND APPARATUS FOR DETECTING MITOTIC BLOOD CELLS ON A BLOOD CELL SAMPLE SLIDE

Filed Nov. 9, 1966

INVENTORS.
Kendall Preston Jr.
Philip E. Norgren
BY
Irving M. Kriegsman
ATTORNEY.

United States Patent Office 3,503,684

Patented Mar. 31, 1970

3,503,684

METHOD AND APPARATUS FOR DETECTING MITOTIC BLOOD CELLS ON A BLOOD CELL SAMPLE SLIDE

Kendall Preston, Jr., New Haven, and Philip E. Norgren, Stamford, Conn., assignors to The Perkin-Elmer Corporation, Norwalk, Conn., a corporation of New York Filed Nov. 9, 1966, Ser. No. 593,056

Int. Cl. G01n *33/16;* G06k *9/08*

U.S. Cl. 356—39 3 Claims

ABSTRACT OF THE DISCLOSURE

A method and apparatus for examining an object on a blood cell sample slide and determining if the object is a mitotic blood cell as opposed to a non-mitotic blood cell or other artifact that may be present on the blood cell sample slide. The object being examined is illuminated with a beam of monochromatic light. The intensity of light diffracted by the object is measured at two specific spatial frequency bands, one of the spatial frequency bands being at approximately 300 to 400 cycles/mm. and the other spatial frequency band being at approximately 65–90 cycles/mm. If the object is a mitotic blood cell, the intensity of light diffracted at the 300 to 400 cycles/mm. band relative to the input beam is about $1.4 \times 10^{-4}$ and the ratio of the intensity of the two spatial frequency bands is approximately 0.5 or less. If both of these requirements are not met, the object is not a mitotic blood cell.

Figure 1:
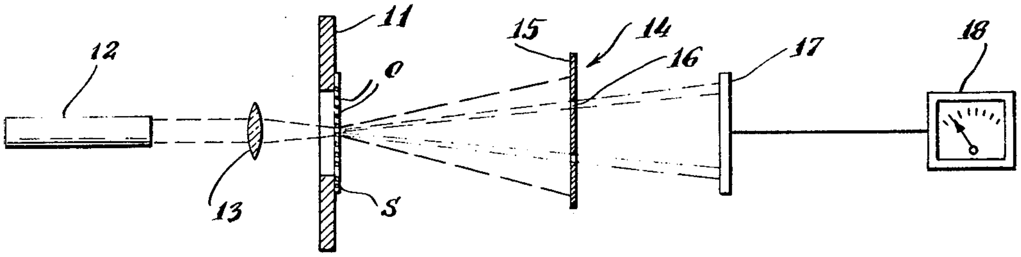

The present invention relates to an apparatus and method for testing objects optically. More particularly, the present invention relates to an apparatus and method for either detecting the presence of (and/or locating) objects of a predefined class or analyzing objects, utilizing Wiener spectrum techniques.

The invention is especially useful in biological and medical analysis for detecting a predefined class of blood cells known as mitotic cells; that is, distinguishing or discriminating mitotic cells from non-mitotic cells and other artifacts that may be present on a blood sample slide. However, it should be noted that the invention is not intended to be limited to locating mitotic cells but may apply equally to locating or detecting any predefined class of objects or particles in which the optical characteristics as described below have similarities which are distinguishable or unique by some observable criteria from all other objects that may be present. For example, the class or group of objects may be defined in terms of, but is not limited to, a physical, chemical, biological, structural, electrical or other property. The class may even be merely a group of dots or dust particles in a clear field. The invention involves detecting in the sense of being able to determine if an object under examination is within the class of predefined objects. Once an object is detected, its location may be noted, or the object may be examined or counted, etc.

The invention may even be used in examining or identifying an object by observing the optical characteristics described below.

It is well known in the fields of medicine and biology to examine the specific characteristics of the chromosomes that become visible in the nucleus of a blood cell during mitosis. The characteristics examined may include the size, shape, spindle attachment and number of chromosomes that are present. Unfortunately, however, this analysis, which is more commonly known as karyotyping, is a time consuming and very costly manual operation. First, a blood sample must be prepared for examination on a microscope slide. Then, the blood cells that are in a state of mitosis, otherwise known as mitotic cells, must be located. This is due to the fact that specific characteristics of the chromosomes of a blood cell are distinguishable only in those blood cells that are mitotic. Once a mitotic cell is located it is photorecorded and then karyotyped. The locating process is extremely slow in that the examiner must slowly move the sample under a microscope until a mitotic cell is located.

This invention as applied to karyotyping is concerned with the problem of automatically and rapidly locating or detecting those cells which are mitotic.

Accordingly, it is an object of this invention to provide a new and improved apparatus and method for optically locating and/or detecting objects of a predefined class.

It is another object of this invention to provide a new and improved method and apparatus for locating mitotic cells optically.

It is still another object of this invention to provide an improved method and apparatus for detecting a predefined class of objects by utilizing the two dimensional Wiener spectrum of the spatial variations of optical transmission of objects in said predefined class.

It is yet still another object of this invention to provide a new and improved method and apparatus for examining objects.

It is another object of this invention to provide an apparatus for measuring the intensity of light scattered by an object over a plurality of spatial frequencies when illuminated by a source of monochromatic light.

It is still another object of this invention to provide a new and improved method of distinguishing or discriminating a predefined class of objects from other objects.

It is yet still another object of this invention to provide a new and improved laser powered system for automatically locating objects of a predefined class for microscopic examination.

It is another object of this invention to provide a new and improved method of optically identifying or distinguishing classes of objects.

The above and other objects are achieved by means of this invention in which the two dimensional Wiener spectrum of the spatial variations of optical transmission is used to distinguish or discriminate classes of objects.

As is well known in the art, the intensity of the angular distribution of light scattered by a two dimensional object illuminated by a coherent optical plane wave is proportional to the Wiener spectrum of the spatial optical electric field transmission of the object. Mathematically, the Wiener spectrum is proportional to the square of the modulus of the Fourier transform of the spatial optical electric field transmission of the object. Thus, the Wiener spectrum is simply a far field diffraction or scatter pattern of monochromatic coherent light that impinges on and is transmitted through or reflected from a two dimensional object. It is measured in terms of light intensity.

It has been proposed to make use of optical Fourier transform matched filtering techniques to detect objects. However, such an arrangement would only be useful in detecting objects that are identical with the object from which the matched filter was designed, i.e., objects that have identical Fourier transformers. On the other hand, this invention makes use of the similarities which may exist in the Wiener spectrum produced by objects in a class to discriminate that class of objects from other objects that may be present. The invention requires only similarity in objects as opposed to identical objects.

With respect to mitotic cells, it has been discovered that the spatial configuration is such that the scattered light pattern is unique and can be distinguished from non-mitotic cells and other artifacts that may be present. This discovery was made by testing a plurality of mitotic cells in a coherent optical Wiener spectrum analyzer. It was found that the ratio of light energy at two particular spatial frequency bands and the magnitude of the energy at the higher frequency band could be used to characterize a mitotic cell.

The invention in one form includes a source of monochromatic spatially coherent light for illuminating an object, a Wiener spatial frequency filter means for passing those spatial frequencies of the scattered light which characterize the class of objects being detected, means for converting the light of those spatial frequencies into signals proportional to their intensity and finally means for comparing the intensity of the signals.

As applied to a mitotic cell, the invention includes a sample holder and a light source arranged to illuminate a portion of the sample with an intense beam monochromatic coherent light. The invention further includes an optical arrangement for filtering the scattered light over two discrete predetermined spatial frequency bands and individual sensing elements for producing individual electrical signals in proportion to the intensity of light transmitted at said two spatial frequency bands. The invention further includes means for comparing the intensity of the output signal at the sensor associated with the higher spatial frequency band and at the same time ratioing the output signals of both sensors to determine if the proper criteria are present which will indicate the detection of a mitotic cell. The resulting output signal may be used to control the movement of the sample holder.

Figure 2:
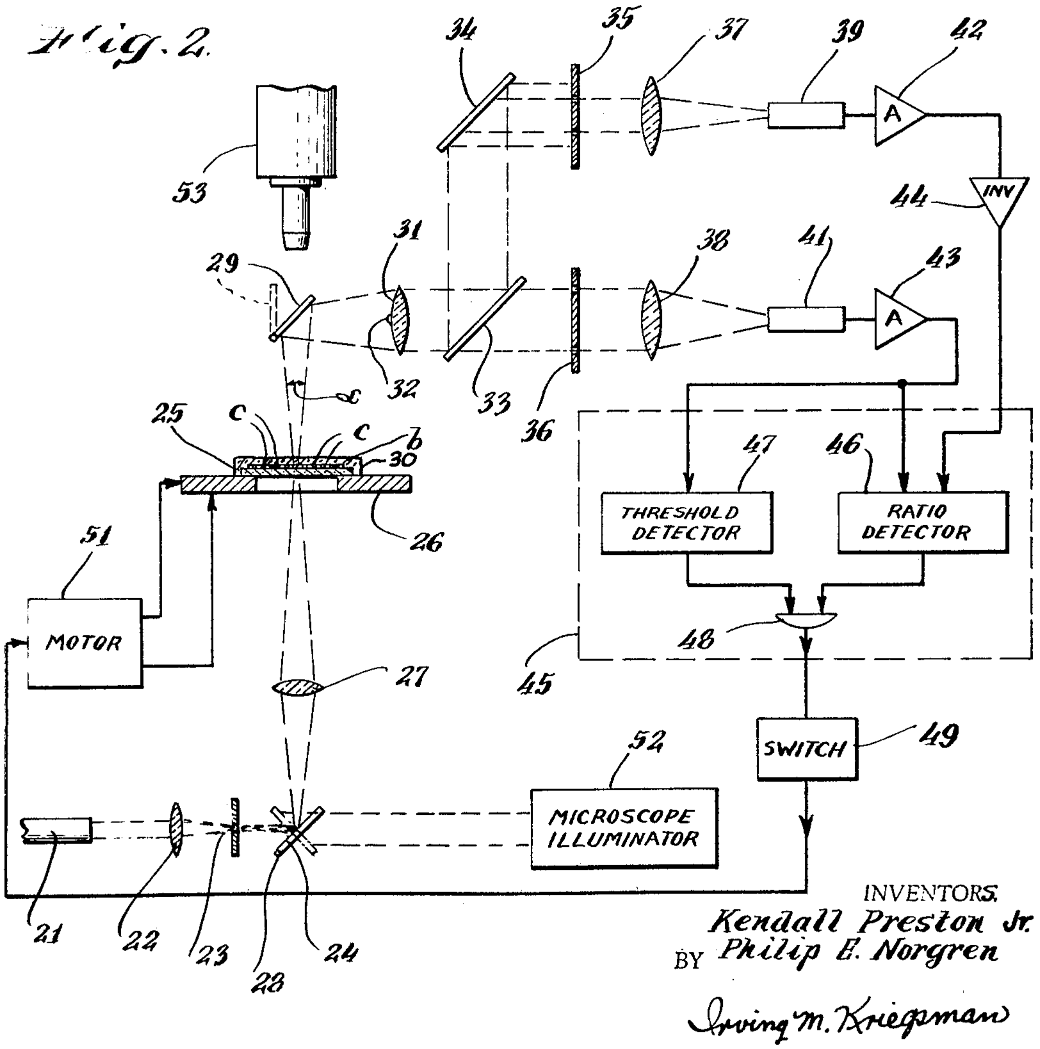

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a schematic representation of a generalized embodiment of the invention; and FIGURE 2 is a schematic representation of a particular embodiment of the invention which is adapted to locate mitotic cells on a blood slide.

Referring now to FIGURE 1, there is shown an apparatus for detecting an object O which may be present on a sample material S. It is assumed that the composition of the objects O with respect to the sample material S in such that the Wiener spectrum produced when the object is illuminated with a source of monochromatic light can be distinguished from the Wiener spectrum when the sample is illuminated by monochromatic light by observing the intensity of light over a particular band of spatial frequencies.

The apparatus includes a sample holder 11 for holding the sample material S.

The apparatus further includes a source 12 of collimated monochromatic high intensity light. Light source 12 may be for example a continuous wave Helium-Neon laser which emits a highly intense beam of collimated monochromatic coherent light at 6328 A. Light source 12 is positioned so as to project a beam of light in the direction of the sample S.

The diameter of the collimated light beam *a* that is the spot size of the light beam *a* should be as close as possible to the size of the object O being located so that only one object will be illuminated at one time. Accordingly, the apparatus may include beam forming optics 13, such as for example a lens disposed on each side of a pinhole, located along the beam path between the light source 12 and sample S for forming a spot at its focus on the sample material S whose diameter is commensurate with the size of the object O.

The apparatus further includes a spatial frequency filter 14 positioned in the path of a beam of scattered or diffracted light and in optical alignment therewith for passing light corresponding to a predetermined band of spatial frequencies while at the same time rejecting light of other spatial frequencies. The spatial frequency filter 14 may be in the form of a body of nontransmissive material 15 having a clear light transparent annular slot or ring 16. The particular band of spatial frequencies that will be passed by the filter 14 will be dependent on the width and diameter of the annular ring 16. The predetermined band of spatial frequencies is any band of frequencies over which the intensity of scattered light caused by an object O will differ from the intensity of light scattered due to the sample material S.

The apparatus further includes a light sensitive element for intercepting the light passed through the spatial frequency filter 14 and producing an output signal whose magnitude is proportional to the intensity of the intercepted light. The light sensitive element may be for example a photomultiplier tube 17 for producing an electrical output signal.

The output from the photomultiplier tube 17 is then fed into a comparator which may be, for example, a meter 18. Thus, by simply observing the meter deflection, it is possible to detect if the light beam from the source 12 is illuminating an object O.

Referring now to FIGURE 2, there is shown a system for detecting and examining mitotic cells.

The system includes a source 21 of monochromatic collimated high intensity light. Source 21 may be for example a continuous wave ½ milliwatt Helium-Neon laser which emits a high intensity collimated beam of monochromatic coherent light at 6328 A.

The light from the source 21 is directed through a first condensing lens 22 and brought to focus at a pinhole 23. The light emerging through the pinhole 23 is then reflected off a 45° mirror 24 in the direction of a blood sample *b* which is deposited or otherwise prepared on a holder or transparent slide 25. Mirror 24 is fully reflective on both sides. Slide 25 is mounted or secured to a microscope stage 26 or other equivalent supporting structure.

The transparent slide 25, which may be fabricated from glass is preferably immersed in a fluid 30 such as, for example, immersion oil, whose index of refraction matches as close as possible the index of refraction of the transparent slide 25. The purpose of the fluid 30 is to eliminate unwanted phase variations caused by the slide 25. These phase variations may, for example, be due to the variations in thickness of the slide 25.

The microscope stage 26 is disposed in a plane normal to the axis of the reflected light beam and is adapted for movement in two directions in said plane. Thus, means are provided for effecting a scanning movement of the light beam relative to the sample *b*. A second condensing lens 27 is positioned between the 45° mirror 24 and the sample slide 25 to form a beam spot of approximately 50 microns in diameter at its focus on the slide 25. This spot diameter is approximately equal to the size of a mitotic cell. Thus only one cell is illuminated at one time by the light beam. Mirror 24 is pivotally mounted on a pin 28.

The diffracted or scattered light emerging from the sample that is illuminated by the light source 21 has the spatial configuration of a Wiener spectrum. The angle of scattering $\alpha$ and the light intensity over any particular spatial frequency will be determined by the particular object that is illuminated.

In any event, the light thus scattered is reflected off a rotatable mirror 29 and collimated by means of a lens 31. An obscuration 32 which for convenience may be mounted on the lens 31 blocks off zero order or undiffracted light.

It has been found that the spectra of scattered light for a mitotic cell can be distinguished from the spectra of non-mitotic cells and other artifacts by two simple threshold measurements. One is the light intensity at a spatial frequency of 80 cycles/mm. and the other is the light intensity at a spatial frequency of 350 cycles/mm. By observing the intensity at 350 cycles/mm. against a fixed threshold and ratioing the intensity at 80 cycles/mm. to the intensity at 350 cycles/mm., it can be determined if the object being illuminated is a mitotic cell. Good results have been obtained by using the following parameters:

(1) The intensity over a frequency band of 300 to 400 cycles/mm.$=1.4\times10^{-4}$ of the light intensity of the source (at 6328 A.);

(2) The ratio of the intensity over a frequency band of 65 to 90 cycles/mm. to the intensity over a frequency band of 300 to 400 cycles/mm.=0.5 or less.

Accordingly, the system includes an arrangement for determining the intensity of light scattered over these two spatial frequencies.

The arrangement includes a beamsplitter 33 for directing the scattered light beam into two beams or channels. For convenience the reflected beam or channel may be redirected by means of a mirror 35. A spatial frequency filter 35 designed to pass light over a spatial frequency band of 65–90 cycles/mm. is disposed along one of the beam paths and a spatial frequency filter 36 designed to pass slightly over a spatial frequency band of 300 to 400 cycles/mm. is disposed along the other beam path. Light passing through each of the spatial filters 35, 36 is collected by means of individual lenses 37, 38 and brought to focus on individual photomultiplier tubes 39 and 41 respectively. The two spatial frequency filters 35 and 36 are similar in construction to the spatial frequency filter 14 shown in FIGURE 1. The band of frequencies passed by each filter 35 and 36 is dependent on the particular width and diameter of the clear annular ring.

The output signal from each photomultiplier tube 39 and 41 is then fed into amplifiers 42 and 43 respectively. The outputs from the amplifier 42 is then fed into an inverter 44. The output from the inverter 44 and the amplifier 43 is then fed into a comparator 45. The comparator 45 may be in the form of a ratio detector 46 connected to amplifier 43 and inverter 44 and a threshold detector 47 connected to amplifier 43. The outputs from the detectors 46 and 47 may be connected to an AND-gate 48 whose output may be connected to a switch 49. The switch 49 in turn is connected to a motor 51 which controls the movement of the microscope stage 26. Thus, the movement of the microscope stage 26 can be stopped when a mitotic cell is located.

Once a mitotic cell is located, the mirrors 24 and 29 are rotated to the positions shown by dotted lines. The mitotic cell is then illuminated by a conventional incoherent light source 52 and viewed through a microscope objective 53.

What is claimed is:

1. A method of examining an object on a blood sample slide which may either be a mitotic blood cell, a non-mitotic blood cell or an artifact, and determining if the object is a mitotic blood cell, comprising the steps of:

(a) illuminating the object with a known beam of high intensity monochromatic light;

(b) measuring the intensity of the light beam emerging from the object due to diffraction over a first spatial frequency band, said first spatial frequency band being within approximately 300 to 400 cycles/mm.;

(c) measuring the intensity of the light beam emerging from the object due to diffraction over a second spatial frequency band, said second spatial frequency band being within approximately 65–90 cycles/mm.;

(d) determining a first ratio of the intensity of light diffracted by the object over the 300 to 400 cycles/mm. spatial frequency band to the intensity of the known beam of high intensity monochromatic light;

(e) determining a second ratio of the intensity of light diffracted by the object at the 65–90 cycles/mm. spatial frequency band to the intensity of the the object at the 300 to 400 cycles/mm. spatial frequency band;

(f) whereby, if the object is a mitotic cell, the first ratio will be approximately $1.4\times10^{-4}$ and the second ratio will be approximately 0.5 or less.

2. Apparatus for examining an object on a blood sample slide which may be either a mitotic blood cell, a non-mitotic blood cell or an artifact, and determining if the object is a mitotic blood cell, comprising:

(a) a support member for holding a blood sample slide, said blood sample slide containing an object which is to be examined;

(b) a laser for illuminating the object on the blood sample slide, the object diffracting some of the light from the laser so as to produce a diffracted beam;

(c) a beamsplitter positioned along the path of the diffracted beam for dividing the diffracted beam into two diffracted beam parts;

(d) a spatial filter designed to pass diffracted light over a spatial frequency band of approximately 300 to 400 cycles/mm. disposed along one of the diffracted beam parts;

(e) a spatial filter designed to pass diffracted light over a spatial frequency band of approximately 65–90 cycles/mm. disposed along the other diffracted beam part;

(f) means for measuring the intensity of light passed by each of the spatial filters; and (g) means for ratioing the intensity of light passed by the two spatial filters;

whereby if the object is a mitotic cell, the intensity of light diffracted by the object over the 300 to 400 cycles/mm. spatial frequency band will have an intensity of approximately $1.4\times10^{-4}$ of the input beam and the ratio of the intensity of light diffracted by the object at the 65–90 cycles/mm. spatial frequency band to the light diffracted by the object at the 300 to 400 cycles/mm. spatial frequency band will be approximately 0.5 or less.

3. Apparatus according to claim 2 and further including a microscope for examining the object which is illuminated by the laser.

References Cited

UNITED STATES PATENTS

| | | | |
|---|---|---|---|
| 2,875,666 | 3/1959 | Parker et al. | 356—178 X |
| 2,938,424 | 5/1960 | Herriott | 356—178 |
| 3,090,281 | 5/1963 | Maréchal et al. | 350—162 X |
| 3,177,757 | 4/1965 | Polanyi | 356—41 |
| 3,178,997 | 4/1965 | Kelly | 350—162 X |
| 3,194,110 | 7/1965 | Eppig et al. | 356—178 X |
| 3,296,444 | 1/1967 | Wilson | 356—178 X |
| 3,305,834 | 2/1967 | Cooper et al. | 350—162 X |
| 3,306,156 | 2/1967 | Glasser et al. | 356—178 X |
| 3,402,001 | 9/1968 | Fleisher | 350—162 X |

RONALD L. WIBERT, Primary Examiner

W. A. SKLAR, Assistant Examiner

U.S. Cl. X.R.

350—162; 356—71